United States Patent
Hong (10) Patent No.: US 9,050,866 B2
(45) Date of Patent: Jun. 9, 2015

(54) SEALANT BOTTLE FOR TIRE REPAIR OF GAS PRESSURE TYPE

(71) Applicant: Active Tools International (HK) Ltd., Causeway Bay (HK)

(72) Inventor: Ying Chi Hong, Causeway Bay (HK)

(73) Assignee: Active Tools International (HK) Ltd., Causeway Bay (HK)

( * ) Notice: Subject to any disclaimer, the term of this patent is extended or adjusted under 35 U.S.C. 154(b) by 315 days.

(21) Appl. No.: 13/847,926

(22) Filed: Mar. 20, 2013

(65) Prior Publication Data

US 2014/0283949 A1 Sep. 25, 2014

(51) Int. Cl.
*B60C 25/00* (2006.01)
*B29C 73/16* (2006.01)

(52) U.S. Cl.
CPC .............. *B60C 25/16* (2013.01); *B29C 73/166* (2013.01)

(58) Field of Classification Search
CPC .............................. B29C 73/166; B60C 25/16
USPC ..................................................... 141/38, 105
See application file for complete search history.

(56) References Cited

U.S. PATENT DOCUMENTS

| | | | | |
|---|---|---|---|---|
| 6,789,581 | B2 * | 9/2004 | Cowan et al. | 141/38 |
| 7,028,720 | B2 * | 4/2006 | Eckhardt | 141/38 |
| 7,748,295 | B2 * | 7/2010 | Hong | 81/15.6 |
| 7,798,183 | B2 * | 9/2010 | Cegelski et al. | 141/38 |
| 8,205,645 | B2 * | 6/2012 | Dowel | 141/38 |
| 8,336,581 | B2 * | 12/2012 | Lolli et al. | 141/38 |
| 8,746,293 | B2 * | 6/2014 | Chou | 141/38 |
| 2009/0107578 | A1 * | 4/2009 | Trachtenberg et al. | 141/5 |

* cited by examiner

*Primary Examiner* — Timothy L Maust
(74) *Attorney, Agent, or Firm* — Raymond R. Ferrera; Adams and Reese LLP (57) ABSTRACT

A sealant bottle for tire repair of gas pressure type which comprises a bottle body configured for containing sealant. The bottle body is provided with a sealant outlet and an air inlet, wherein a bottle cap is disposed at the sealant outlet and the air inlet is connected with a straight pipe assembly. An air-inlet end of the straight pipe assembly is connected with an air throat which is further provided with an explosion proof element. A sealant guiding pipe disposed within the bottle cap is comprised of a first pipe section arranging along the axial direction of the bottle body and a second pipe section perpendicular to the first pipe section. A second step is disposed between inlets of the first pipe section and the second pipe section, and a rubber plug is further disposed between the inlet of the first pipe section and the second step.

10 Claims, 5 Drawing Sheets

SEALANT BOTTLE FOR TIRE REPAIR OF GAS PRESSURE TYPE

FIELD OF THE INVENTION

This invention relates to a sealant bottle for tire repair, and more specifically to a sealant bottle for tire repair of gas pressure type.

BACKGROUND OF THE INVENTION

In the prior art, the air produced by an air compressor is usually employed for pressing the sealant within a sealant bottle into a tire during the process of tire repair. Afterwards, by means of slow forward movement of the automobile, the sealant pressed thereinto can cover an inner wall of the tire uniformly for achieving the tire repair. Accordingly, such process for tire repair is simple in operation. However, a valve plug of the tire which is connected with the sealant bottle may be blocked, or a sealant outlet at a bottle cap of the sealant bottle may not be opened smoothly under the action of air during this process. In this case, the pressure within the sealant bottle will build up increasingly and thus a danger of explosion may be caused.

SUMMARY OF THE INVENTION

Aiming at the drawbacks that the pressure within the sealant bottle is too large and an explosion may take place due to the blocked valve plug and the closed sealant outlet in the prior art, the technical problem to be solved in this invention is to provide a sealant bottle for tire repair of gas pressure type which can lower down the high pressure within the sealant bottle automatically and ensure the safety during its usage.

The technical solution adopted to solve its technical problems in this invention is as follows: a sealant bottle for tire repair of gas pressure type is provided. It comprises a bottle body configured for containing sealant. The bottle body is provided with a sealant outlet and an air inlet, wherein a bottle cap is disposed at the sealant outlet and the air inlet is connected with a straight pipe assembly which is inserted into the bottle body and configured to transfer some air into the bottle body. An air-inlet end of the straight pipe assembly is connected with an air throat for transferring the air into the straight pipe assembly, and the air throat is further provided with an explosion proof element configured for preventing the bottle body from explosion.

A sealant guiding pipe is disposed within the bottle cap. It is comprised of a first pipe section arranging along the axial direction of the bottle body and a second pipe section perpendicular to the first pipe section and connected to a sealant throat. A second step is disposed on the pipe wall between inlets of the first pipe section and the second pipe section, and a rubber plug is further disposed between the inlet of the first pipe section and the second step. The first and second pipe sections are connected to each other between the second step and a tail end of the first pipe section.

In the above-mentioned sealant bottle for tire repair of gas pressure type, the explosion proof element comprises a rear housing, a front housing connected with the rear housing and a tapered piston in flexible connection with the rear housing. An air releasing hole is disposed at an end of the rear housing and a spring is disposed within the front housing. Herein, one end of the spring is placed in a cavity which is located inside the front housing and is matched with the shape of the spring, while its other end is sleeved with an end cylinder on the tapered piston. A lock washer provided with an air discharging slot is fixedly mounted between the rear housing and the front housing.

In the above-mentioned sealant bottle for tire repair of gas pressure type, the explosion proof element is located at the air-inlet end of the air throat.

In the above-mentioned sealant bottle for tire repair of gas pressure type, a neck tube with an external thread is disposed at the sealant outlet of the bottle body. The bottle cap is provided with a holding cavity of which the inner wall is disposed with an internal thread adapted with the external thread. The first pipe section is disposed within the holding cavity, and a sealing gasket is provided between the neck tube and a top surface of the holding cavity. The tail end of the first pipe section extends to a top part of the holding cavity and the second pipe section is disposed within the top part of the holding cavity.

In the above-mentioned sealant bottle for tire repair of gas pressure type, the straight pipe assembly comprises a straight pipe connector, a first straight pipe and a second straight pipe that are connected with each other sequentially. An air sealing ring for straight pipe is provided between the straight pipe connector and the first straight pipe, and a gasket for straight pipe which is configured to prevent the sealant within the bottle body from leakage is provided at the connection point between the first and the second straight pipes.

In the above-mentioned sealant bottle for tire repair of gas pressure type, both the gasket for straight pipe and the air sealing ring for straight pipe are O-shaped rings.

In the above-mentioned sealant bottle for tire repair of gas pressure type, a sponge for straight pipe is further disposed within the first straight pipe, wherein the sponge for straight pipe is configured to prevent the sealant from flowing to the air throat when the sealant bottle for tire repair of gas pressure type is inverted.

In the above-mentioned sealant bottle for tire repair of gas pressure type, the straight pipe connector is connected with the air inlet by way of clamping, and some sealing sealant is encapsulated within a gap between the straight pipe connector and the air inlet.

In the above-mentioned sealant bottle for tire repair of gas pressure type, the straight pipe connector is in screwed connection with the air throat, and a sealing gasket is disposed between the straight pipe connector and the air throat.

In the above-mentioned sealant bottle for tire repair of gas pressure type, an end of the sealant throat that has no connection with the bottle cap is disposed with a tire connection nozzle.

When implementing the sealant bottle for tire repair of gas pressure type in this invention, the following advantageous effect may be achieved: in this invention, the explosion proof element is disposed on the air throat. Accordingly, during the process of tire repair, the air can flow out through the air releasing hole on the explosion proof element so as to reduce the high pressure within the sealant bottle and thus ensure the safety during the tire repair when the pressure within the sealant bottle is too high. Besides, the rubber plug can move in the first pipe section following the pressure within the bottle body by the adoption of the bottle cap with the sealant guiding pipe as well as the step and the rubber plug arranged in the first pipe section of the sealant guiding pipe. In this way, not only the sealant is supplied to the breakage of the tire through changing the gas pressure within the bottle body, but also the sealant leakage and the damage to sealant bottle are avoided in the event of fluctuating pressure within the bottle body. The sealant bottle for tire repair in this invention is simple in structure and low in cost. Besides, it can effectively lower down the pressure within the sealant bottle, ensure the safety during its usage and bring convenience for storage.

BRIEF DESCRIPTION OF THE DRAWINGS

Below this invention will be further explained in detail with reference to accompanying drawings and specific embodiments. In the figures.

DETAILED DESCRIPTION OF THE PREFERRED EMBODIMENT

The forward and backward orientations in this invention are defined as follows: when an air compressor is used to supply some air into the sealant bottle for tire repair, the orientation of the air compressor refers to the backward orientation, while the orientation of the sealant bottle refers to the forward one.

As shown in FIGS. 1-8C, a sealant bottle for tire repair of gas pressure type is provided in this invention. It comprises a bottle body 1 provided with a sealant outlet 11 and an air inlet 4. Herein, a bottle cap 2 is disposed at the sealant outlet 12 and the air inlet 12 is connected with a straight pipe assembly 5 which is inserted into the bottle body 1 and configured to transfer some air into the bottle body 1. An air-inlet end of the straight pipe assembly 5 is connected with an air throat 6 for transferring the air into the straight pipe assembly 5, wherein the air throat 6 is further provided with an explosion proof element 7 configured for preventing the bottle body 1 from explosion. A sealant guiding pipe is disposed within the bottle cap 2. It is comprised of a first pipe section 21 arranging along the axial direction of the bottle body 1 and a second pipe section 22 perpendicular to the first pipe section 21. The tail end 222 of the second pipe section 22 is connected to a sealant throat 3 so that the sealant within the bottle body is guided to the tire. A first step 25 is disposed at an inlet 211 of the first pipe section 21, and a second step 26 is disposed on the pipe wall between inlets 211 and 212 of the first pipe section 21 and the second pipe section 22. A rubber plug 26 is further disposed between the inlet 211 of the first pipe section 21 and the second step 26, and the first and second pipe sections 21 and 22 are connected to each other between the second step 26 and a tail end 212 of the first pipe section 21.

Based on the above-mentioned structure, the air throat 6, the straight pipe assembly 5, the bottle cap 2 (especially the sealant guiding pipe within the bottle cap 2) and the sealant throat 3 form a passage under the action of the air produced by the air compressor. In this case, the sealant within the bottle body 1 flows to the tire through the bottle cap 2 and the sealant throat 3. Meanwhile, some air can further be supplied into the tire through such passage when all the sealant is used up. In addition, the explosion proof element 7 on the air throat 6 can be connected to the surrounding atmosphere automatically when the pressure within the bottle body 1 is too high, thus lowering down the high pressure within the bottle body 1.

Figure 3:
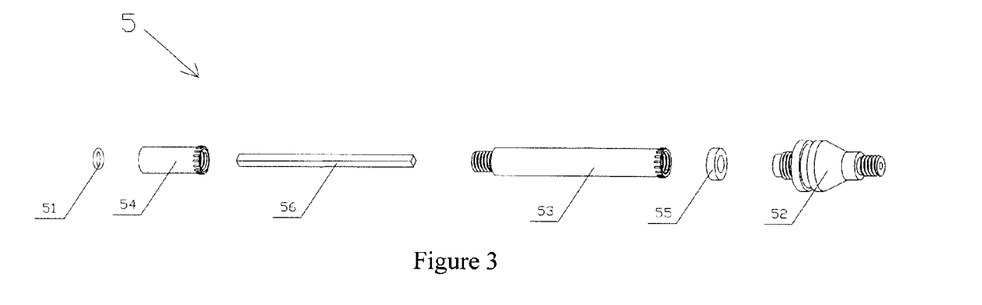
FIG. 3 is an exploded structural diagram for the straight pipe assembly of the sealant bottle for tire repair of gas pressure type according to an embodiment of this invention.

Referring to FIG. 3, the straight pipe assembly 5 in this invention is comprised of a straight pipe connector 52, a first straight pipe 53 and a second straight pipe 54 that are connected with each other sequentially. Herein, the straight pipe connector 52 is the air-inlet end of the straight pipe assembly 5. A gasket for straight pipe 51 is located at an open end of the second straight pipe 54, i.e. the air-outlet end of the straight pipe assembly 5. In order to guarantee the air impermeability of the straight pipe assembly 5, an air sealing ring for straight pipe 55 is fixedly arranged between the straight pipe connector 52 and the first straight pipe 53 that are in screwed connection with each other; meanwhile, a gasket for straight pipe 51 is disposed at the connection point between the first and second straight pipes 53 and 54 so as to prevent the sealant within the bottle body 1 from leakage. Both the gasket for straight pipe 51 and the air sealing ring for straight pipe 55 mentioned here are O-shaped rings. In another embodiment, a sponge for straight pipe 56 is arranged within the first straight pipe 53. In this regard, the air produced by the air compressor firstly passes through the sponge for straight pipe 56 and then enters the second straight pipe 54 after it goes into the straight pipe assembly 5. Accordingly, the sealant is prevented from flowing to the air throat when the sealant bottle for tire repair of gas pressure type is inverted by adoption of the sponge for straight pipe 56.

Figure 4:
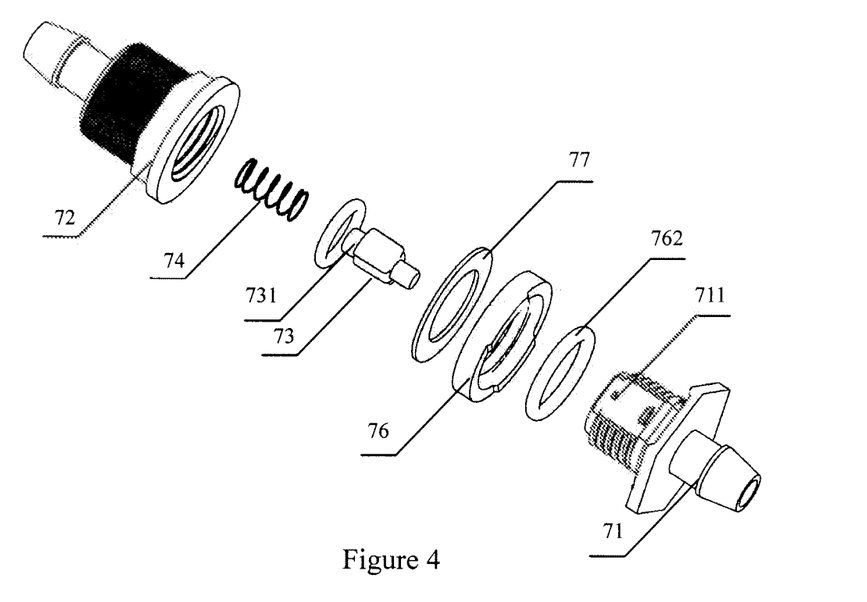
FIG. 4 is an exploded structural diagram for the explosion proof element according to an embodiment of this invention.
Figure 5A:
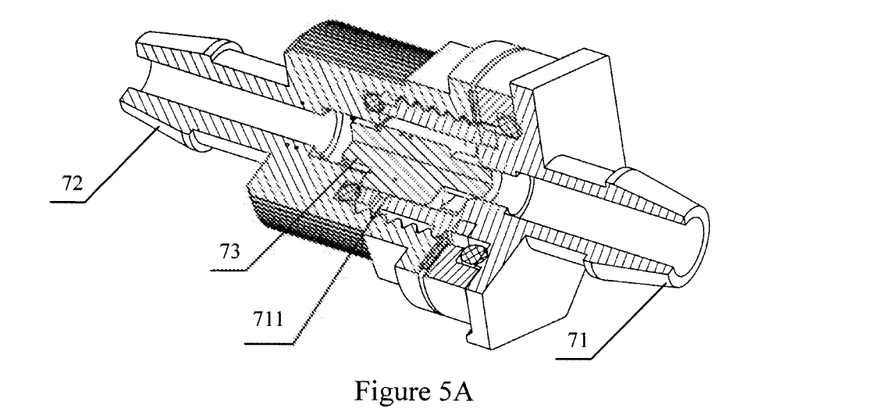
FIG. 5A is a sectional view illustrating the explosion proof element when its air releasing hole is closed according to an embodiment of this invention.
Figure 5B:
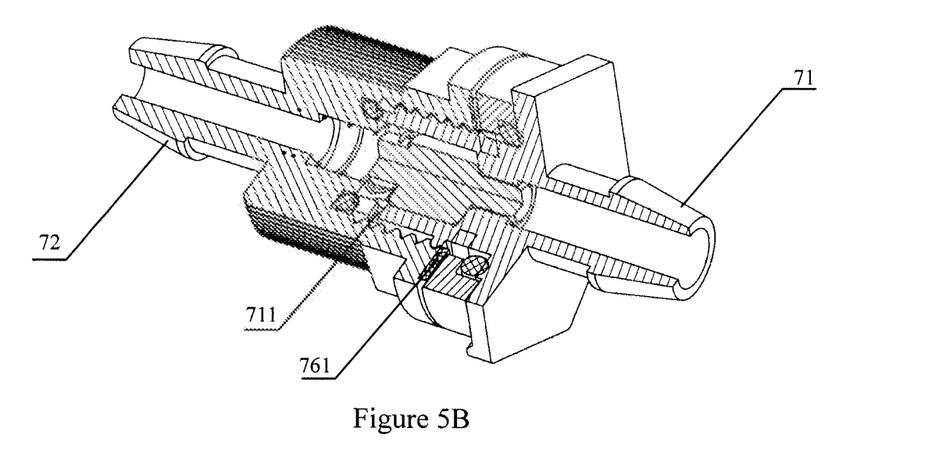
FIG. 5B is a sectional view illustrating the explosion proof element when its air releasing hole is opened according to an embodiment of this invention.
Figure 6:
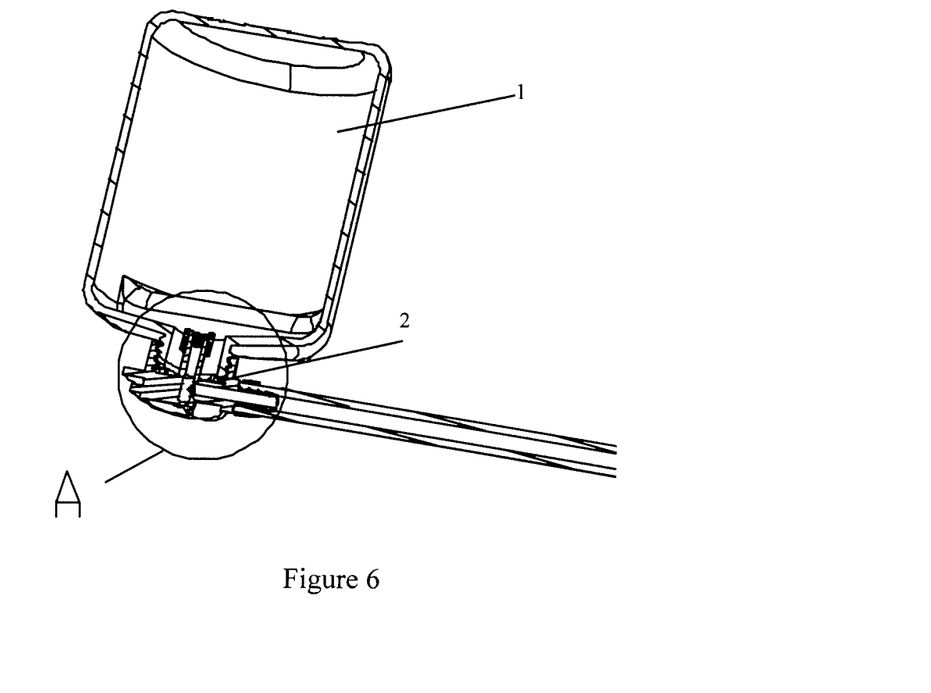
FIG. 6 is a cross-sectional view for the sealant bottle for tire repair of gas pressure type according to an embodiment of this invention.

The explosion proof element 7 arranged on the air throat 6 is the key structure for guaranteeing the safety usage of the sealant bottle for tire repair in this invention. In FIGS. 4-5B, the explosion proof element 7 comprises a rear housing 71, a front housing 72 connected with the rear housing 71 and a tapered piston 73 in flexible connection with the rear housing 71. An air releasing hole 711 is disposed at an end of the rear housing 71, and a spring 74 is disposed within the front housing 72. Moreover, one end of the spring 74 is placed in a cavity which is located inside the front housing 72 and is matched with the shape of the spring 74, and its other end is sleeved with an end cylinder 731 on the tapered piston 73. A lock washer 76 provided with an air discharging slot 761 is fixedly mounted between the rear housing 71 and the front housing 73. Wherein, the lock washer 76 is integrally arranged with the rear housing 71. In addition, the lock washer 76 is also provided with an annular groove, wherein an O-shaped sealing ring 762 is disposed within the annular groove. After finishing assembling the explosion proof element 7, a sealing gasket 77 is further disposed between the front housing 72 and the lock washer 76 so that the two are sealed with each other. In this way, only a gap for the air discharging slot 761 is left between the two for air exhaust. The specific processes of the explosion proof element 7 for realizing the air inflation and the air exhaust are described briefly in the following: when the air compressor runs, the tapered piston 73 moves toward the front housing 72 to compress the spring 74 under the action of air pressure, and thus the air releasing hole 711 is blocked by the tapered piston 73. In this circumstance, air can enter a pressure reducing valve and finally enter the bottle body 1 through a groove on the surface of the tapered piston 73 after passing through the rear housing 71. Also, at this moment, only a slight amount of air is discharged from the air releasing hole 711. Instead, when the pressure within the bottle body 1 is too large, the spring 74 presses against the tapered piston 73 to make it move towards the rear housing 71 until the air releasing hole 711 is no longer blocked. At this moment, some air can be discharged by the air releasing hole 711 after passing through the air discharging slot 761 on the lock washer 76.

The specific position of the explosion proof element 7 in the air throat 6 is not limited here, and its installation position also has no influence on its implementation effect. In another implementation, the explosion proof element 7 is in proximity to the connection point of the air throat 6 and the air-inlet end of the straight pipe assembly. Of course, the explosion proof element 7 can also be located at the middle part of the air throat 6. The operation process and operation principle for the explosion proof element 7 at different locations are the same as each other, and thus they will not be repeatedly described here.

Figure 8A:
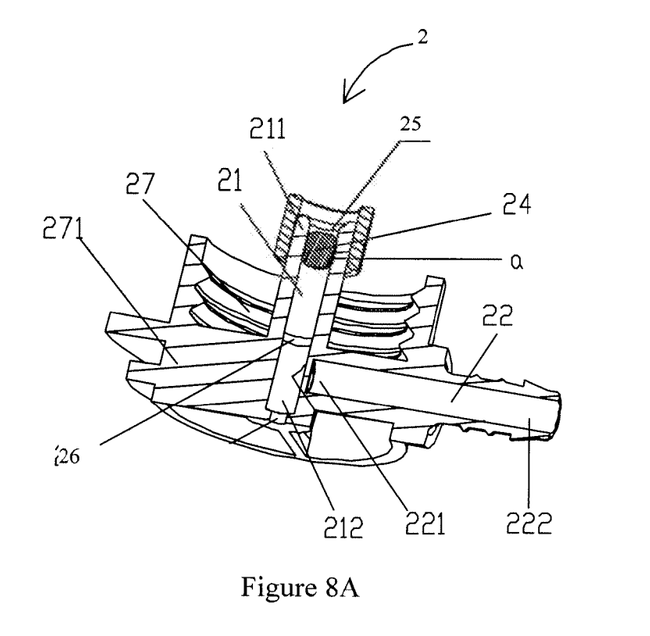
FIG. 8A illustrating the sealant bottle for tire repair of gas pressure type when the rubber plug inside the bottle cap is located at position a at normal temperature and pressure in an embodiment of this invention.
Figure 8B:
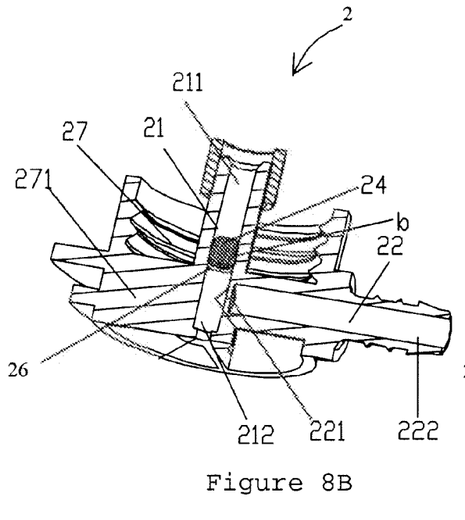
FIG. 8B illustrating the sealant bottle for tire repair of gas pressure type when the rubber plug inside the bottle cap is located at position b in the case of being expanded with heat in an embodiment of this invention.
Figure 8C:
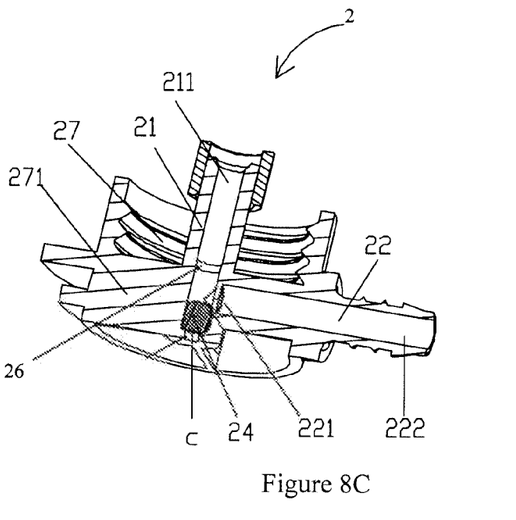
FIG. 8C illustrating the sealant bottle for tire repair of gas pressure type when the rubber plug inside the bottle cap is located at position c in the case of being introduced with some compressed air in an embodiment of this invention.

In this invention, the rubber plug 24 can move in the first pipe section 21 according to the pressure change within the bottle body 1 so that the sealant outlet is blocked or opened as required. As shown in FIG. 8A, the rubber plug 24 is located between an inlet 211 of the first pipe section 21 and the second step 26 (i.e. position a) at normal temperature and pressure. In this case, the rubber plug 24 blocks the sealant outlet and the sealant within the bottle body 1 is prevented from flowing outwards. As shown in FIG. 8C, the pressure within the bottle body 1 suddenly increases once the air compressor works. Herein, the rubber plug 24 thus moves to a position between the tail end 212 of the first pipe section 21 and the connection point of the first and second pipe sections 21 and 22 (i.e. position c). At this moment, a passage is formed for the first and second pipe sections 21 and 22, and thus the sealant can flow to a breakage of the tire from the bottle body 1 by passing through the sealant guiding pipe and the sealant throat 3. In this way, some sealant can be supplied to the breakage of the tire for tire repair by changing the pressure within the bottle body 1. It can be seen that such operation process is simple and convenient for promotion.

In addition, a first step 25 is disposed at the inlet 211 of the first pipe section 21, and the second step 25 is disposed between such inlet 211 and the inlet 221 of the second pipe section 22. As a result, although the rubber plug 24 can move inside the first pipe section 21 when the temperature within the bottle body 1 rises and the sealant expands due to surrounding environmental change, its movement is eventually limited by the arrangement of the second step 26. That is, the rubber plug can move from the inlet 211 of the first pipe section 21 to the second step 26 to the largest extent (i.e. position b), and it is finally blocked at the second step 26 (as shown in FIG. 8b). On the other hand, instead of moving into the bottle body and further causing sealant leakage under the external pressure, the rubber plug 24 is blocked at the first step 25 when the temperature within the bottle body 1 falls and the sealant shrinks due to surrounding environmental change. Accordingly, the first and second steps 25 and 26 are configured for ensuring that any leakage or any other damage caused by temperature change of surrounding environment is prevented from the sealant bottle even when the sealant bottle containing the sealant is stored in any extreme environment.

Figure 1:
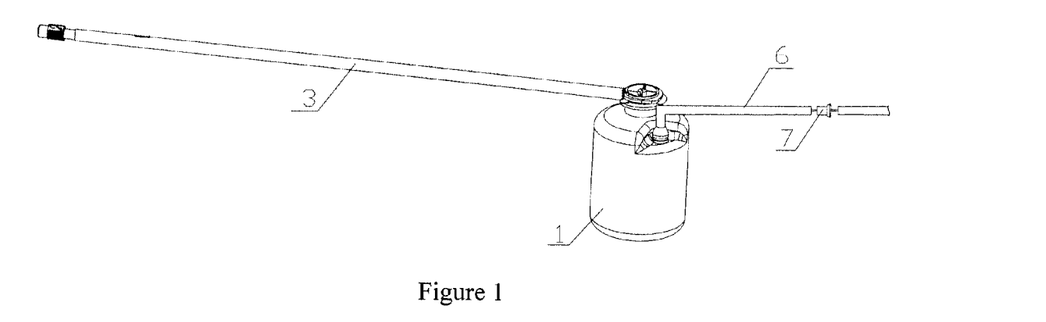
FIG. 1 is a schematic diagram illustrating the connection of the sealant bottle for tire repair of gas pressure type during its usage.
Figure 2:
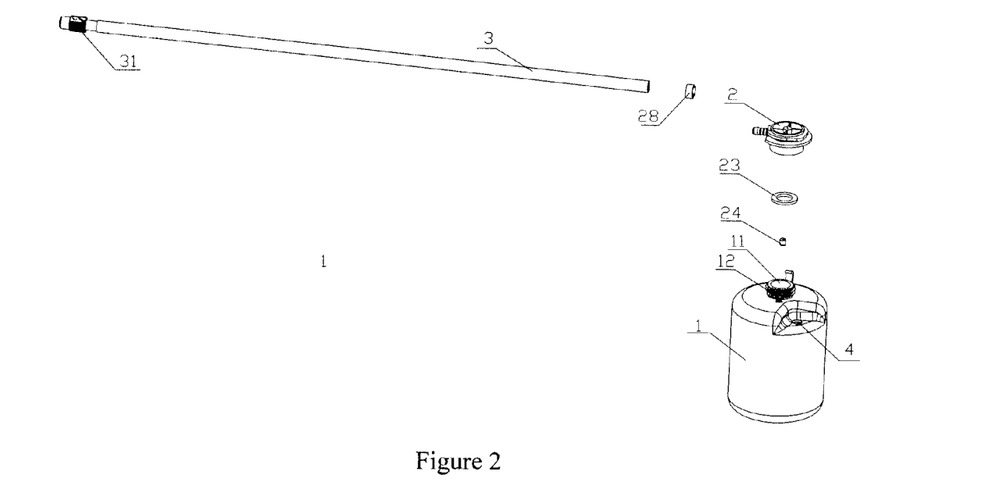
FIG. 2 is an exploded structural diagram for the sealant bottle for tire repair of gas pressure type according to an embodiment of this invention.
Figure 7:
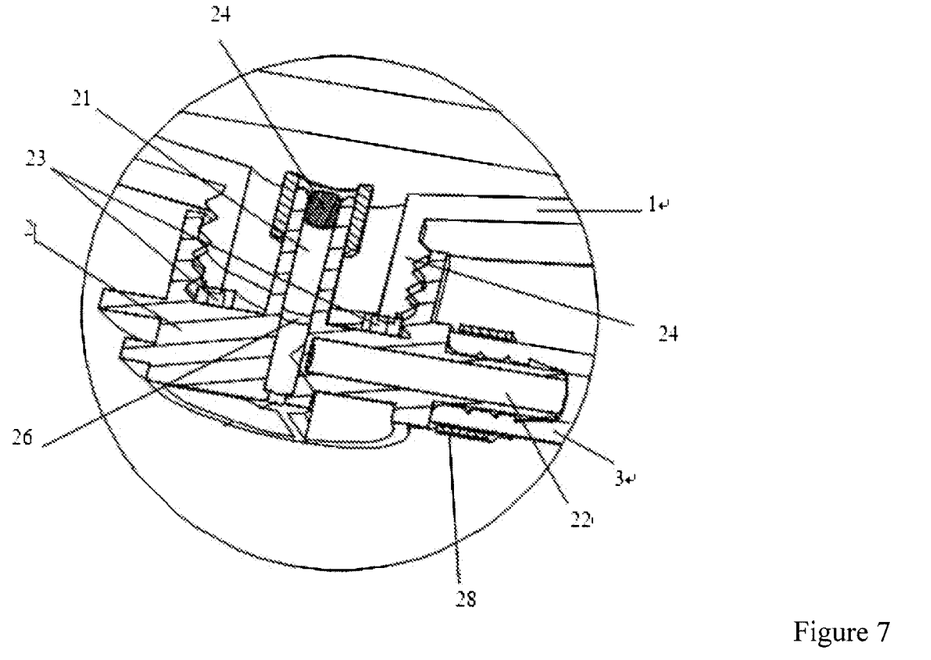
FIG. 7 is an enlarged view of A in FIG. 6.

As shown in FIGS. 2 and 7, a neck tube 12 with an external thread is further disposed at the opening of the bottle body 1. The bottle cap 2 is provided with a holding cavity 27 of which the inner wall is disposed with an internal thread adapted with the external thread. The first pipe section 21 is disposed within the holding cavity 27, and a sealing gasket 23 which is tightly pressed by the end of the neck tube 12 is provided between the neck tube 12 and a top surface of the holding cavity 27. As a result of the sealing gasket, it can be avoided that some sealant flows from the connection gap between the bottle body 1 and the bottle cap 2. The tail end 212 of the first pipe section 21 extends to the top part of the holding cavity 27 and the second pipe section 22 is inserted into the top part 271 of the holding cavity 27. Wherein, the top surface and the top part refer to the corresponding portion between the holding cavity 27 and the bottle cap 2.

In this invention, as mentioned above, the operation principle of the sealant bottle for tire repair of gas pressure type is as follows:

State 1: such sealant bottle for tire repair of gas pressure type is installed in the air compressor in an inverted way when the air compressor has not been working before the tire repair. The air-outlet end of the straight pipe assembly 5 is blocked by the gasket for straight pipe 5 right now so that it is ensured the sealant within the bottle body 1 is prevented from flowing out of the straight pipe assembly. Moreover, the rubber plug 24 arranged in the bottle cap is located at the opening of the first pipe section 21 in such a way that the sealant within the bottle body 1 is prevented from flowing to the sealant throat 3 through the bottle cap.

State 2: During the process of normal tire repair, the sealant throat 3 is connected with the valve plug of the tire to be repaired. The air compressor starts to work now and the air releasing hole 711 of the explosion proof element 7 is otherwise blocked. As a result, the air produced from the air compressor firstly enters the straight pipe assembly 5 through the air throat 6 and further bursts through the gasket for straight pipe 51 at the air-outlet end therein. Thereafter, the pressure within the bottle body 1 increases continuously which makes the rubber plug 24 within the bottle cap 2 move to the end portion of the first pipe section 21. The sealant within the bottle body 1 thus flows into the tire by passing through the sealant guiding pipe in the bottle cap 2 and the sealant throat 3 sequentially. Meanwhile, the tire is inflated to a certain pressure through such passage.

State 3: In the event of abnormal condition during tire repair, in specific, if the valve plug of the tire is blocked or the rubber plug 24 cannot be forced to move within the bottle cap, too large pressure is caused in the bottle body 1 since the air produced by the air compressor enters the bottle body 1 constantly. In this invention, however, the air releasing hole 711 of the explosion proof element 7 is no longer blocked right now, and the air can be discharged from the air discharging slot 76 on the lock washer 76 after passing through the air releasing hole 711 which functions as lowering down the pressure within the bottle body 1.

State 4: the sealant throat 3 is removed from the valve plug of the tire when finishing the tire repair (or when interrupting the tire repair owing to abnormal condition). At this moment, the tire repair operation is ended or interrupted.

It is mentioned that there may be another abnormal condition in state 3. That is, after the air compressor starts to work, the air produced therefrom cannot burst through the gasket for straight pipe 51 at the air-outlet end of the straight pipe assembly. Although the pressure within the bottle body 1 is free of any influence, high pressure is yet caused between the straight pipe assembly and the air throat 6. In this invention, the air releasing hole 711 of the explosion proof element 7 is no longer blocked in this case, and the air can be discharged from the air discharging slot 76 on the lock washer 76 after passing through the air releasing hole 711 which functions as avoiding any danger that may be caused by the high pressure within the straight pipe assembly and the air throat 6.

High requirement on the air impermeability is made to the whole apparatus of this invention due to its design of gas pressure type. In order to improve the air impermeability of such apparatus, the following configurations are adopted: (1) some sealing sealant is encapsulated in the gap formed when the straight pipe connector 52 is connected in the air inlet 4 by way of clamping; (2) a sealing gasket is further arranged between the straight pipe connector 52 and the air throat 6 when the two is in screwed connection with each other; and (3) air sealing ring for straight pipe 55 is arranged between the straight pipe connector 52 and the first straight pipe 53.

On the other hand, high requirement on the air impermeability is also made to the bottle cap 2 of the sealant bottle in this invention since this sealant bottle for tire repair of gas pressure type is installed in the air compressor in an inverted way. Specifically, the following configurations are included herein: (1) a sealing gasket 23 is arranged between the neck tube 12 and the top surface of the holding cavity 27; and (2) the rubber plug 24 is adopted to increase the impermeability of the sealant guiding pipe in the bottle cap 2.

Moreover, a locking ring 28 is disposed at the connection point between the sealant guiding pipe and the sealant throat 3. One end of the sealant throat 3 is clamped by the locking ring 28 to achieve a fixed connection with the bottle cap 2. The design of locking ring 28 contributes to increasing the impermeability of the connection between the bottle cap 2 and the sealant throat 3 in such a way that the sealant is prevented from leakage by the gap between the two. Herein, the other end of the sealant throat 3 (i.e. the end located away from the bottle cap 2) is provided with a tire connection nozzle 31 so as to be connected with the tire to be repaired.

In conclusion, the sealant can flow into the tire to achieve the tire repair under the action of air during the process of tire repair on one hand by adoption of the sealant bottle for tire repair of gas pressure type in this invention. On the other hand, when the pressure within the bottle body of the sealant bottle is too large, the explosion proof element can be connected to the surrounding atmosphere which thus lowers down the high pressure within the bottle body effectively and ensures the safety usage for the sealant bottle. Moreover, the impermeability of this invention is excellent in which case any problems such as low efficiency in tire repair caused by sealant leakage or air leakage are hold back.

All mentioned above are only the preferred embodiments of this invention, which are not intended to limit this invention. Any modifications, equivalents or improvements made within the spirit and principle of this invention should be included in the protection scope of this invention.

The invention claimed is:

1. A sealant bottle for tire repair of gas pressure type, comprising a bottle body (1) configured for containing sealant; the bottle body (1) is provided with a sealant outlet and an air inlet (4), wherein a bottle cap (2) is disposed at the sealant outlet and the air inlet (4) is connected with a straight pipe assembly (5) which is inserted into the bottle body (1) and configured to transfer some air into the bottle body (1); wherein an air-inlet end of the straight pipe assembly (5) is connected with an air throat (6) for transferring the air into the straight pipe assembly (5), and the air throat (6) is further provided with an explosion proof element (7) configured for preventing the bottle body (1) from explosion;

a sealant guiding pipe is disposed within the bottle cap (2); the sealant guiding pipe is comprised of a first pipe section (21) arranged along the axial direction of the bottle body (1) as well as a second pipe section (22) perpendicular to the first pipe section (21) and connected to a sealant throat (3); a first step (25) is disposed at an inlet (211) of the first pipe section (21), a second step (26) is disposed on the pipe wall between the inlet (211) of the first pipe section (21) and an inlet (221) of the second pipe section (22), and a rubber plug (26) is further disposed between the inlet (211) of the first pipe section (21) and the second step (26); the first and second pipe sections (21, 22) are connected to each other between the second step (26) and a tail end (212) of the first pipe section (21).

2. The sealant bottle for tire repair of gas pressure type according to claim 1, wherein the explosion proof element (7) comprises a rear housing (71), a front housing (72) connected with the rear housing (71) and a tapered piston (73) in flexible connection with the rear housing (71); an air releasing hole (711) is disposed at an end of the rear housing (71) and a spring (74) is disposed within the front housing (72); wherein one end of the spring (74) is placed in a cavity which is located inside the front housing (72) and is matched with the shape of the spring (74), while its other end is sleeved with an end cylinder (731) on the tapered piston (73); a lock washer (76) provided with an air discharging slot (761) is fixedly mounted between the rear housing (71) and the front housing (72).

3. The sealant bottle for tire repair of gas pressure type according to claim 1 or 2, wherein the explosion proof element (7) is located at the air-inlet end of the air throat (6).

4. The sealant bottle for tire repair of gas pressure type according to claim 1 or 2, wherein a neck tube (12) with an external thread is disposed at the sealant outlet of the bottle body (1); the bottle cap (2) is provided with a holding cavity (27) of which the inner wall is disposed with an internal thread adapted with the external thread;

the first pipe section (21) is disposed within the holding cavity (27), and a sealing gasket (23) is provided between the neck tube (12) and a top surface of the holding cavity (27);

the tail end (212) of the first pipe section (21) extends to a top part (271) of the holding cavity (27) and the second pipe section (22) is disposed within the top part (271) of the holding cavity (27).

5. The sealant bottle for tire repair of gas pressure type according to claim 1 or 2, wherein the straight pipe assembly (5) comprises a straight pipe connector (52), a first straight pipe (53) and a second straight pipe (54) that are connected with each other sequentially; an air sealing ring for straight pipe (55) is provided between the straight pipe connector (52) and the first straight pipe (53), and a gasket for straight pipe (51) which is configured to prevent the sealant within the bottle body (1) from leakage is provided at the connection point between the first and the second straight pipes (53, 54).

6. The sealant bottle for tire repair of gas pressure type according to claim 5, wherein both the gasket for straight pipe (51) and the air sealing ring for straight pipe (55) are O-shaped rings.

7. The sealant bottle for tire repair of gas pressure type according to claim 5, wherein a sponge for straight pipe (56) is further disposed within the first straight pipe (53), wherein the sponge for straight pipe (56) is configured to prevent the sealant from flowing to the air throat (6) when the sealant bottle for tire repair of gas pressure type is inverted.

8. The sealant bottle for tire repair of gas pressure type according to claim 5, wherein the straight pipe connector (52) is connected with the air inlet (4) by way of clamping, and some sealing sealant is encapsulated within a gap between the straight pipe connector (52) and the air inlet (4).

9. The sealant bottle for tire repair of gas pressure type according to claim 5, wherein the straight pipe connector (52) is in screwed connection with the air throat (6), and a sealing gasket is disposed between the straight pipe connector (52) and the air throat (6).

10. The sealant bottle for tire repair of gas pressure type according to claim 1, wherein an end of the sealant throat (3) that has no connection with the bottle cap (2) is disposed with a tire connection nozzle (31).

* * * * *